(12) United States Patent
Shin et al.

(10) Patent No.: US 9,520,205 B2
(45) Date of Patent: Dec. 13, 2016

(54) COPPER CONTAINING PARTICLE AND METHOD FOR MANUFACTURING SAME

(71) Applicant: LG CHEM, LTD., Seoul (KR)

(72) Inventors: Jong Min Shin, Daejeon (KR); Jung Hyun Seo, Daejeon (KR); Young Chang Byun, Daejeon (KR); Jae Hoon Choe, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/433,814

(22) PCT Filed: May 12, 2014

(86) PCT No.: PCT/KR2014/004228
§ 371 (c)(1),
(2) Date: Apr. 6, 2015

(87) PCT Pub. No.: WO2014/182141
PCT Pub. Date: Nov. 13, 2014

(65) Prior Publication Data
US 2015/0274987 A1    Oct. 1, 2015

(30) Foreign Application Priority Data
May 10, 2013  (KR) .................. 10-2013-0053412

(51) Int. Cl.
*H01B 1/02*   (2006.01)
*H01B 1/22*   (2006.01)
(Continued)

(52) U.S. Cl.
CPC ............... *H01B 1/02* (2013.01); *B22F 1/0048* (2013.01); *B22F 1/0062* (2013.01); *B22F 1/025* (2013.01);
(Continued)

(58) Field of Classification Search
CPC ............ H01B 1/02; H01B 1/026; H01B 1/16; H01B 1/22; H01B 1/14; H01B 1/20; B22F 1/0048; B22F 1/0051; B22F 1/0062; B22F 1/02; B22F 1/025; B22F 7/002; B22F 7/004; B22F 7/006; B22F 2301/10; B22F 2301/255; H05K 1/09; H05K 1/092; H05K 1/095; H05K 1/097
See application file for complete search history.

(56) References Cited

U.S. PATENT DOCUMENTS

| 5,198,154 A | 3/1993 | Yokoyama et al. |
| 5,945,158 A | 8/1999 | Djokic et al. |

(Continued)

FOREIGN PATENT DOCUMENTS

| CN | 1717440 A | 1/2006 |
| CN | 101024246 A | 8/2007 |

(Continued)

*Primary Examiner* — Mark Kopec
*Assistant Examiner* — Matthew R Diaz
(74) *Attorney, Agent, or Firm* — Dentons US LLP

(57) ABSTRACT

The present invention relates to a copper containing particle with a surface layer for preventing oxidation and a method for manufacturing the same, and provides a copper containing particle including: a core containing a copper component; a shell formed on the surface of the core, containing a silver component, and having at least one pore; and a filler part configured to fill the pore of the shell and contain an antioxidant component.

10 Claims, 3 Drawing Sheets

(51) Int. Cl.
    *B22F 1/00*       (2006.01)
    *B22F 1/02*       (2006.01)
    *C09D 5/24*      (2006.01)
    *B22F 9/24*       (2006.01)

(52) U.S. Cl.
    CPC . *B22F 9/24* (2013.01); *C09D 5/24* (2013.01); *H01B 1/026* (2013.01); *H01B 1/22* (2013.01); *B22F 2301/10* (2013.01); *B22F 2301/255* (2013.01); *B22F 2998/10* (2013.01); *B22F 2999/00* (2013.01)

(56) References Cited

U.S. PATENT DOCUMENTS

| | | | | |
|---|---|---|---|---|
| 7,700,678 | B2* | 4/2010 | Nakayoshi | C08K 9/04 |
| | | | | 524/413 |
| 7,749,300 | B2* | 7/2010 | Chretien | B01J 13/02 |
| | | | | 75/371 |
| 2004/0127374 | A1 | 7/2004 | Jo et al. | |
| 2009/0280326 | A1* | 11/2009 | Giesenberg | B22F 1/0085 |
| | | | | 428/403 |
| 2010/0294539 | A1* | 11/2010 | Sasaki | C23C 18/1635 |
| | | | | 174/126.4 |
| 2011/0250122 | A1 | 10/2011 | Joo et al. | |

FOREIGN PATENT DOCUMENTS

| | | |
|---|---|---|
| CN | 102773475 A | 11/2012 |
| CN | 103128308 A | 6/2013 |
| KR | 1995-0007085 B1 | 6/1995 |
| KR | 10-2005-0000702 A | 1/2005 |
| KR | 1020090041785 A | 4/2009 |
| KR | 10-2011-0059946 A | 6/2011 |
| KR | 10-2011-0112560 A | 10/2011 |
| SU | 501116 A1 * | 1/1976 |

* cited by examiner

COPPER CONTAINING PARTICLE AND METHOD FOR MANUFACTURING SAME

This application is a National Stage Entry of International Application No. PCT/KR2014/004228, filed May 12, 2014, and claims the benefit of Korean Application No. 10-2013-0053412 filed on May 10, 2013, all of which are hereby incorporated by reference in their entirety for all purposes as if fully set forth herein.

TECHNICAL FIELD

The present invention relates to a copper particle with a surface layer for preventing oxidation and a method of manufacturing the same.

BACKGROUND ART

Metal particles which are an electro-conductive material and a thermally conductive material, are widely used as a filler material of a polymer material, an electrode material, etc.

Gold and silver (Ag) have excellent conductivity, but have a disadvantage due to a high price. Copper and nickel are advantageous in that they are relatively cheaper than gold and silver and have excellent initial electroconductivity, but also are disadvantageous in that they are easily oxidized.

Copper is proposed as an alternative material for silver used in a low temperature conductive silver paste, but the disadvantage of being easily oxidized must be overcome.

In order to overcome the disadvantage of copper, a technique of coating copper with silver or the like has been proposed, but copper particles may not be coated through plating, and a uniform coating layer may not be formed using the existing method.

DISCLOSURE

Technical Problem

The present invention is directed to providing a copper-containing particle which may prevent oxidation of copper and form a uniform coating layer, a method of manufacturing the same, and a conductive paste composition containing the particle.

Technical Solution

One aspect of the present invention provides a copper-containing particle including: a core containing a copper component; a shell formed on the surface of the core, containing a silver component, and having at least one pore; and a filler part configured to fill the pore of the shell and contain an antioxidant component.

In the present invention, a size of the pore may be in the range of 0.1 to 100 nm.

In the present invention, the antioxidant component may be one or more types selected from a thiocyanate group, a compound including a thiocyanate group, an aliphatic acid, an aromatic acid, a mercapto group, a compound including a mercapto group, a hydroxy group, a compound including a hydroxy group, a phosphite group, and a compound including a phosphite group.

In the present invention, the antioxidant component may be directly combined with a copper component exposed through the pore.

In the present invention, the antioxidant component may do not react with the silver component.

In the present invention, a thickness variation of the shell may be in the range of ±50% of an average thickness of the shell.

In the present invention, the core may be one or more types selected from the group consisting of a copper particle, a glass particle coated with copper, a ceramic particle coated with copper, a metal particle coated with copper, a polymer particle coated with copper, and a graphite particle coated with copper.

In the present invention, a ceramic of the ceramic particle coated with copper may be one or more types selected from the group consisting of aluminum oxide, aluminum nitride, beryllium oxide, tungsten carbide, silicon carbide, and zirconium oxide.

In the present invention, a metal of the metal particle coated with copper may be one or more types selected from the group consisting of nickel, iron, silicon, tungsten, cobalt, and aluminum.

In the present invention, content of the silver component may be in the range of 0.1 to 50 wt % with respect to a total weight of the copper-containing particle.

In the present invention, content of the antioxidant component may be in the range of 0.1 to 50 wt % with respect to a total weight of the copper-containing particle.

Further, another aspect of the present invention provides a conductive paste composition including the above-described copper-containing particle, a binder resin, and a solvent.

The conductive paste composition according to the present invention may further include a glass frit, etc.

Further, another aspect of the present invention provides a method of manufacturing a copper-containing particle, including: forming a shell containing a silver component by coating a surface of a core which contains a copper component with a solution which contains a silver compound; and forming a filler part containing an antioxidant component by filling a pore formed in the shell with a solution containing an antioxidant compound.

In the present invention, the silver compound may be one or more types selected from the group consisting of silver nitrate, silver perchlorate, silver chlorate, silver carbonate, silver sulfate, silver chloride, silver bromide, silver acetate, silver fluoride, and silver oxide.

In the present invention, the antioxidant compound may be one or more types selected from a compound including a thiocyanate group, an aliphatic acid, an aromatic acid, a compound including a mercapto group, a compound including a hydroxy group, and a compound including a phosphite group.

The manufacturing method according to the present invention may further include removing an oxide layer of the core before forming the shell. Here, the oxide layer of the core may be removed using a solution containing an alkaline ammonium salt, the alkaline ammonium salt may be one or more types selected from the group consisting of ammonium carbonate, ammonium bicarbonate, and ammonium sulfate, and the solution containing the alkaline ammonium salt may include ammonia or hydrated ammonium.

The manufacturing method according to the present invention may further include adding a complexing agent and reductant after removing the oxide layer of the core. Here, sodium potassium tartrate may be used as the complexing agent and reductant.

Advantageous Effects

According to the embodiment of the present invention, oxidation of copper can be prevented due to a uniform coating layer, and an excellent coating layer may be formed by additionally performing a SCN coating.

DESCRIPTION OF SYMBOLS OF MAIN PARTS IN DRAWINGS

10: CORE
20: SHELL
30: FILLER PART

[Modes of the Invention]

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

Hereinafter, the present invention will be described in detail.

Copper-Containing Particle

Figure 1:
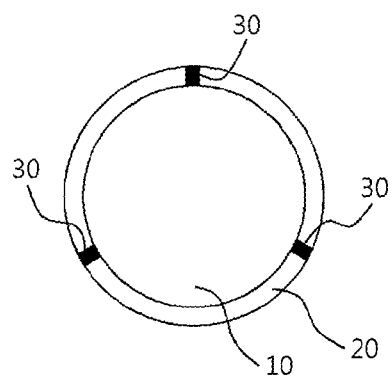
FIG. 1 is a cross-sectional view of a copper-containing particle according to an embodiment of the present invention.

FIG. 1 is a cross-sectional view of a copper-containing particle according to an embodiment of the present invention. The copper-containing particle according to the embodiment of the present invention may have a core 10-shell 20 structure, and include at least one filler part 30. Specifically, the copper-containing particle according to the embodiment of the present invention is based on the core (Cu)/shell (Ag) structure, and a pore formed in an Ag shell is filled with an antioxidant component such as SCN, etc.

The drawings illustrate that the core 10 has a circular cross section, the shell 20 has a uniform thickness, a filler part 30 is formed having a predetermined size and interval, but the illustration is simply an exemplary illustration, which schematically illustrates for ease of understanding. Accordingly, a shape of the core 10, a thickness and a thickness deviation of the shell 20, and the number, sizes, and intervals of the filler parts 30 may be variously modified and different from the drawings. For example, referring to images of FIGS. 2 to 4, the core 10 has a nearly spherical shape, but may have an irregular shape. The shell 20 may be relatively uniformly formed, but may have a thickness variation. The number of the filler parts 30 may be as few as a range from several to several tens and as many as a range from several hundreds to several thousands, and the size and interval of the filler part 30 may be irregular as shown in the images.

When the shell 20 is formed on the core 10, a thickness variation of the shell 20 is generated, and at least one pore may be formed in a part of the shell 20. Particularly, when the coating mechanism of the silver component is a galvanic replacement reaction, a plurality of pores may be necessarily formed. Here, the pore may have a shape of being fully open in a thickness direction of the shell 20 to expose the core 10. Further, the pore may be considered to have a shape of being partially open in a thickness direction of the shell 20, that is, to include a thin part of the shell 20.

As described above, when the pore is formed in the shell 20, copper of the core 10 may be oxidized due to the air flowing through the pore. In the embodiment of the present invention, the pore of the shell 20 is filled with the filler part 30, and thereby copper is blocked from contact with the air and oxidation of copper may be prevented. Further, the pore which may be considered as a thickness variation is filled, and thereby the thickness variation of the shell 20 may be reduced.

The core 10 is a central particle which is an object to be coated, and contains a copper component. As the core 10, one or more types selected from the grou consisting of a copper particle, a glass particle coated with copper, a ceramic particle coated with copper, a metal particle coated with copper, a polymer particle coated with copper, and a graphite particle coated with copper may be used.

The copper particle may be a particle prepared by electrolysis, a particle prepared by chemical reduction, an atomized particle, a particle mechanically prepared, etc. A shape of the copper particle may be dendritic, spherical, flaky, granular, hollow, etc. A size of the copper particle may be in the range of 0.5 to 50 μm.

A ceramic of the ceramic particle coated with copper may be one or more types selected from the group consisting of aluminum oxide, aluminum nitride, beryllium oxide, tungsten carbide, silicon carbide, and zirconium oxide.

A metal of the metal particle coated with copper may be one or more types selected from the group consisting of nickel, iron, silicon, tungsten, cobalt, and aluminum.

The shell 20 is formed on a surface of the core 10, and contains a silver component. The coating mechanism of the silver component may be a galvanic replacement reaction. The silver component may be present in the form of an element, ion, and/or oxide, or the like in the shell 20, and preferably, may be present in the form of a zerovalent metal.

Content of the silver component included in the shell 20 may be in the range of 0.1 to 50 wt %, and preferably, in the range of 1 to 50 wt % with respect to a total weight of the copper-containing particle. When content of the silver component is very low, the shell 20 is very thin, and thus there is a problem in that an oxidation temperature of the particle does not change, and when content of the silver component is very high, there is a problem in that silver ions are coated on the core 10, and a separate silver particle is generated.

Further, the content of the silver component may vary according to a size of the core 10. For example, when the size of the core 10 is in the range of 0.5 to 6 μm, the content of the silver component may be in the range of 10 to 50 wt % with respect to a total weight of the copper-containing particle. When the size of the core 10 is in the range of 6 to 50 μm, the content of the silver component may be in the range of 0.1 to 30 wt % with respect to a total weight of the copper-containing particle.

A thickness of the shell 20 may vary according to a size of the core 10, a concentration of silver, or the like, for example, may be in the range of 10 nm to 1 μm, preferably, in the range of 30 to 700 nm, and more preferably, in the range of 50 to 400 nm.

The shell 20 may be formed with a relatively uniform thickness, the thickness variation of the shell 20 may be, for example, ±50%, preferably ±30%, and more preferably ±10% of an average thickness of the shell 20. For example, when the thickness of the shell 20 is about 200 nm, the thickness variation is within about 10%, but as the thickness of the shell 20 is smaller, the deviation may increase.

As described above, the shell 20 may include at least one pore, and preferably a plurality of pores. The number of the pores may vary according to the thickness of the shell 20, or the like, for example, may be in the range of 1 to 100,000, preferably in the range of 10 to 50,000, and more preferably in the range of 100 to 9,000. A diameter of the pore may be, for example, in the range of 0.1 to 100 nm, preferably in the range of 0.1 to 50 nm, and more preferably in the range of 0.2 to 20 nm.

The filler part 30 fills the pore of the shell 20, and contains an antioxidant component. The antioxidant component may be present in the form of an element, ion, radical, compound, complex compound, and/or oxide, or the like in the filler part 30.

The antioxidant component may be one or more types selected from a thiocyanate group, a compound including a thiocyanate group, an aliphatic acid, an aromatic acid, a mercapto group, a compound including a mercapto group, a hydroxy group, a compound including a hydroxy group, a phosphite group, and a compound including a phosphite group, and preferably, may be the thiocyanate group or the compound including the thiocyanate group.

Examples of the compound including the thiocyanate group may include thiocyanic acid (HSCN), sodium thiocyanate (NaSCN), potassium thiocyanate (KSCN), etc.

Examples of the aliphatic acid or aromatic acid may include ascorbic acid, beta-carotene, tannic acid, etc.

An example of the compound including the hydroxy group may include a phenol-based compound or the like, and examples of the phenol-based compound may include a phenol, a bisphenol, a high-molecular-weight phenol, a sulfur containing phenol, BHT (2-6-di-t-butyl-4-methylphenol), etc.

An example of the compound including the phosphite group may include tris(nonylphenyl) phosphite (TNPP), etc.

Content of the antioxidant component included in the filler part 30 may be in the range of 0.1 to 50 wt %, and preferably in the range of 1 to 30 wt % with respect to a total weight of the copper-containing particle. When content of the antioxidant component is very low, the surface of the particle is insufficiently filled, and thus there is a problem in that an oxidation temperature does not change, and when a content is very high, stability of the particle decreases due to a salt effect, and thus there is a problem in that the antioxidant may not fill well.

Further, content of the antioxidant component may vary according to a size of the core 10. For example, when a size of the core 10 is in the range of 0.5 to 6 μm, the content of the antioxidant component may be in the range of 1 to 30 wt % with respect to a total weight of the copper-containing particle. When the size of the core 10 is in the range of 6 to 50 μm, the content of the antioxidant component may be in the range of 0.1 to 20 wt % with respect to a total weight of the copper-containing particle.

The antioxidant component may be directly combined with an exposed copper component through the pore of the shell 20, and for example, may be combined in the form of β-Cu-SCN. Particularly, the antioxidant component may not react with the silver component. Accordingly, even though a surface of the shell 20 is coated with a solution containing the antioxidant compound, the surface of the shell 20 is not coated with the antioxidant component, and only the pore of the shell 20 is filled.

Conductive Paste Composition

Further, the embodiment of the present invention provides a conductive paste composition including the above-described copper-containing particle, a binder resin, and a solvent. Since the composition includes the binder resin and the solvent, the composition is also referred to as an organic vehicle.

Content of the copper-containing particle may be in the range of 10 to 98 wt %, preferably in the range of 30 to 95 wt %, and more preferably in the range of 50 to 90 wt % with respect to a total weight of the composition.

As the binder resin, one or a mixture of two or more types of a cellulose-based resin such as ethyl cellulose, methyl cellulose, nitro cellulose, carboxymethyl cellulose, or the like, an acryl-based resin, an alkyd resin, a styrene resin, a phenol resin, a polyvinyl alcohol, a polyvinyl butyral, or the like may be used. Among them, in terms of dispersibility of conductive powders, coating properties of a paste, degradation of vehicle properties (degradability) upon calcination or the like, the acrylic resin and ethyl cellulose may be preferably used. These resin components are dissolved in an organic solvent and used. Content of the binder resin may be in the range of 0.1 to 50 wt %, preferably in the range of 1 to 40 wt %, and more preferably in the range of 3 to 30 wt % with respect to a total weight of the composition.

The solvent may be added to dissolve organic components and disperse conductive powders or the like so as to adjust a viscosity. As the solvent, one or a mixture of two or more types of texanol(2,2,4-trimethyl-1,3-pentandiolmonoisobutyrate), ethyleneglycol(terpene), butyl carbitol, ethylcellosolve, ethylbenzene, isopropylbenzene, methylethylketone, dioxane, acetone, cyclohexanone, cyclopentanone, isobutylalcohol, dimethylsulfoxide, α- or β-terpineol, a pine oil, a polyvinyl butyral, 3-methoxybutyl acetate, γ-butyrolactone, diethylphthalate, or the like may be used.

The conductive paste composition according to the embodiment of the present invention may further include a glass frit, or the like. The glass frit functions as an adhesive combining conductive powders or the like, and has an effect of improving adhesion of a conductive paste to a ceramic or glass substrate, and at the same time, has an effect of cohering the glass frit to the substrate side because the glass frit is softened upon sintering. When the paste composition is used for an internal electrode of the ceramic multilayer substrate, the glass frit is preferably not used. When the paste composition is used to form a surface electrode of a display substrate or ceramic substrate, the glass frit in the range of 0.1 to 30 wt %, preferably in the range of 0.5 to 20 wt %, more preferably in the range of 1 to 10 wt % may be added with respect to a total weight of the composition.

Further, the conductive paste composition of the embodiment of the present invention may further include additives such as a polymerization inhibitor such as hydroquinone monomethyl ether; and a dispersant such as a polyacrylate and a cellulose derivative to provide storage stability; a tackifier such as a silane coupling agent to improve adhesion to the substrate; an antifoamer to improve a coating performance; a plasticizer to improve workability; a thixotropic agent, or the like in addition to the above-described components.

The conductive paste composition may be used for forming an electrode, a resistor, a condenser, an electromagnetic wave shield, a circuit, etc.

Manufacturing Method

The embodiment of the present invention provides a method of manufacturing the copper-containing particle, the manufacturing method of the embodiment of the present invention may include: forming a shell 20 containing a silver component by coating a surface of a core 10 which contains a copper component with a solution which contains a silver compound; and forming a filler part 30 containing an antioxidant component by filling a pore formed in the shell 20 with a solution containing an antioxidant compound.

Preferably, the manufacturing method according to the embodiment of the present invention may further include removing an oxide layer of the core 10 before forming the shell 20, and may further include adding a complexing agent and reductant after removing the oxide layer of the core 10.

First, the oxide layer of the core 10 is removed. Specifically, the oxide layer of the core 10 may be removed using a solution containing an alkaline ammonium salt. As the ammonium salt, ammonium carbonate, ammonium bicarbonate, ammonium sulfate, or the like may be used. Among them, ammonium sulfate is preferable because it has a better effect of increasing a coating surface and a deposition rate. The solution may be an aqueous solution. A concentration of the ammonium salt in the solution may be in the range of 0.01 to 1000 mmol, preferably in the range of 0.05 to 100 mmol, and more preferably in the range of 0.01 to 10 mmol. This washing process may be performed at room temperature.

When the oxide layer of the core is treated with the alkaline ammonium salt solution, a surface of the core 10 may be cleaned and activated. The core 10 is dissolved in the alkaline ammonium salt solution and provides a clear surface, and thereby resulting in easy deposition of silver.

The ammonium salt solution may include ammonia or hydrated ammonium. When an amount of the ammonia is adjusted, a dissolution rate of copper may be controlled. A concentration of the ammonia or hydrated ammonium may be in the range of 1 to 50%, preferably in the range of 10 to 40%, and more preferably in the range of 20 to 35%.

A dissolution reaction of a surface oxide and hydrate of the core 10 may be as follows.

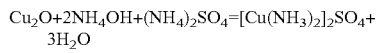

$Cu_2O+2NH_4OH+(NH_4)_2SO_4=[Cu(NH_3)_2]_2SO_4+3H_2O$ $CuO+2NH_4OH+(NH_4)_2SO_4=[Cu(NH_3)_4]SO_4+3H_2O$ $Cu(OH)_2+2NH_4OH+(NH_4)_2SO_4=[Cu(NH_3)_4]SO_4+4H_2O$ [Reaction Formula 1]

A dissolution reaction of a surface layer of copper metal may be as follows.

$Cu+0.5O_2+2NH_4OH+(NH_4)_2SO_4=[Cu(NH_3)_4]SO_4+3H_2O$ [Reaction Formula 2]

Under these conditions, the surface of copper is cleaned and activated, and a replacement reaction may rapidly occur.

Next, after the oxide layer of the core 10 is removed, the complexing agent and reductant are added. The complexing agent and reductant may be added in the liquid form, and here, the solution may be an aqueous solution. As the complexing agent and reductant, sodium potassium tartrate or the like may be used. In order to suppress precipitation of copper hydroxide, a $Cu^{2+}$ ion complexing agent is required to be added. Sodium potassium tartrate acts as the complexing agent for the copper ion, and at the same time, acts as the mild reductant for the silver ion. A concentration of sodium potassium tartrate in the solution is required to be sufficient to complex the copper ions and reduce the silver ions. In order to form a uniform silver coating layer, the minimum quantity of sodium potassium tartrate should be at least 65 g with respect to 100 g of copper powder. The concentration of sodium potassium tartrate in the solution may be in the range of 65 to 1000 g/L, and preferably in the range of 100 to 500 g/L with respect to 100 g of copper powder. The same quantity is required with respect to particles coated with copper. A copper-tartrate complex is stable even under reaction conditions with pH reduced to 7.

Next, after the complexing agent and reductant are added, the shell 20 containing the silver component is formed by coating a surface of the core 10 containing the copper component with the solution containing a silver compound. The solution may be an aqueous solution.

As the silver compound, one or more types selected from the group consisting of silver nitrate, silver perchlorate, silver chlorate, silver carbonate, silver sulfate, silver chloride, silver bromide, silver acetate, silver fluoride, and silver oxide may be used, and silver nitrate may be preferably used.

The solution for silver coating, for example, may include silver nitrate and hydrated ammonium, and here, a mix ratio of silver nitrate and hydrated ammonium may be, for example, in the range of 1:1 to 1:5 as a molar ratio. A dissolution reaction of silver nitrate in hydrated ammonium may be as follows.

$2AgNO_3+2NH_4OH=Ag_2O+2NH_4NO_3+H_2O$ $Ag_2O+4NH_4OH=2[Ag(NH_3)_2]OH+3H_2O$ $[Ag(NH_3)_2]OH+NH_4NO_3=[Ag(NH_3)_2]NO_3+NH_4OH$ [reaction Formula 3]

When a silver ion solution is added to a slurry including a core particle, an ammonium salt solution, and a reductant solution, the following replacement reaction may occur on a surface of activated copper.

$Cu+2[Ag(NH_3)_2]NO_3=[Cu(NH_3)_4](NO_3)_2+2Ag$ [Reaction Formula 4]

When a silver monolayer is formed on a surface of the core, silver is reduced by tartrate, and thereby an additional silver layer may be formed on the silver monolayer. This reaction may be as follows.

$2Ag(NH_3)_2^++2OH^-=Ag_2O+4NH_3+H_2O$ $3Ag_2O+C_4H_4O_6^{2-}+2OH^-=6Ag+2C_2O_4^{2-}+3H_2O$ [Reaction Formula 5]

The reaction may be performed at room temperature. A total time required for the process may be about 15 minutes, and the reduction reaction may be completed within about 5 minutes.

Thereafter, after a solution is removed, powder may be filtered, cleaned with deionized water to be pH 7, and then dried at about 105° C.

Then, the filler part 30 containing the antioxidant component is formed by coating the shell 20 with the solution containing the antioxidant compound and filling the pore formed in the shell 20 with the solution. The solution may be an acid solution or an aqueous solution.

The antioxidant compound may be one or more types selected from a compound including a thiocyanate group, an aliphatic acid, an aromatic acid, a compound including a mercapto group, a compound including a hydroxy group, and a compound including a phosphite group, and preferably, may be the compound including the thiocyanate group.

Examples of the compound including the thiocyanate group may include thiocyanic acid (HSCN), sodium thiocyanate (NaSCN), potassium thiocyanate (KSCN), etc.

Examples of the aliphatic acid or aromatic acid may include ascorbic acid, beta-carotene, tannic acid, etc.

Examples of the compound including the hydroxy group may include a phenol-based compound or the like, and examples of the phenol-based compound may include a phenol, a bisphenol, a high-molecular-weight phenol, a sulfur containing phenol, BHT, etc.

An example of the compound including the phosphite group may include TNPP, etc.

The coating solution may include water and/or an acid such as sulfuric acid, etc. A coating time may be in the range of 2 to 20 hours.

As described above, in the embodiment of the present invention, oxidation of a copper particle may be prevented by forming a coating layer of silver and an antioxidant component such as SCN or the like on a surface of the copper particle. Further, a coating uniformity of the silver-coated copper particle may be improved and oxidation of copper may be further effectively prevented by coating with an antioxidant.

EXAMPLE 100 g of copper particles having a size of 3 μm were added to 13 mL of 0.17 mmol ammonium sulfate and 36.6 mL of 29% hydrated ammonium. The slurry was stirred at 500 rpm for about 5 minutes. After stirring was stopped, particles were precipitated within 1 to 5 minutes, and a supernatant having a blue color was removed. After 107 g of sodium potassium tartrate was dissolved in 580 mL of water, the solution was added to the slurry, and the slurry was stirred for 3 to 5 minutes. 100 g of silver nitrate was dissolved in 87.2 g of a 29 vol % hydrated ammonium aqueous solution and 200 g of water, and the mixed solution was added to the slurry in drops. After about 13 minutes, a reaction was completed, solids were separated, cleaned, filtered, and dried. Then, with respect to 3 g of the prepared Cu/Ag particles, a secondary coating of silver-coated copper particles was performed using a solution including 0.15 g of KSCN, 30 g of water, and 0.07 g of sulfuric acid. After coating was completed, the coated particles were separated, cleaned, filtered, and dried.

Experimental Example

Figure 2:
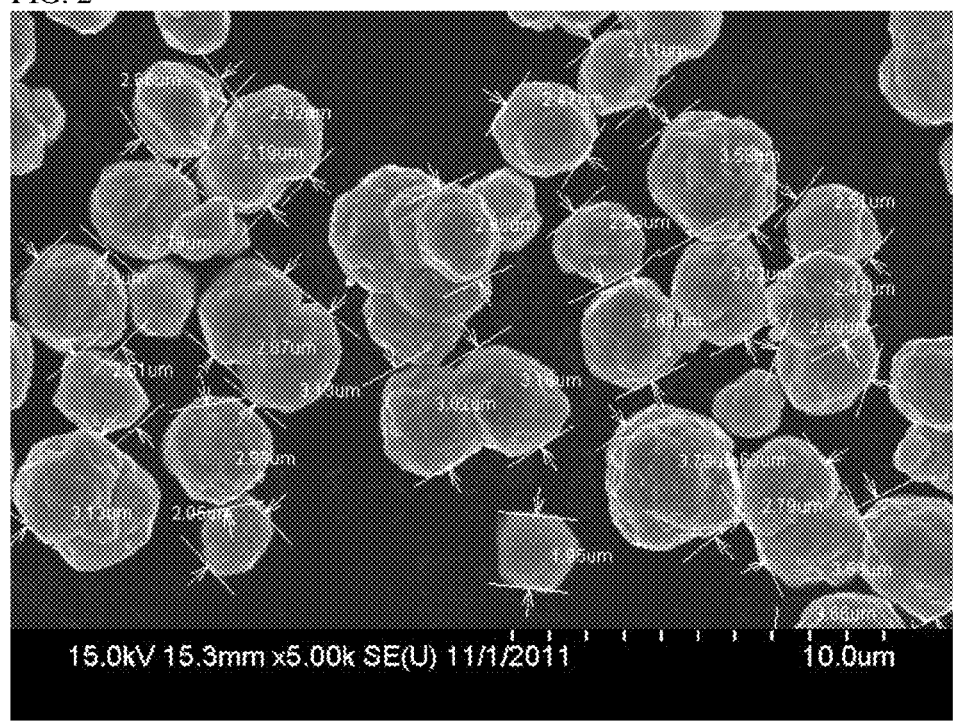
FIG. 2 is a field emission scanning electron microscope (FESEM) image of pure Cu particles.
Figure 3:
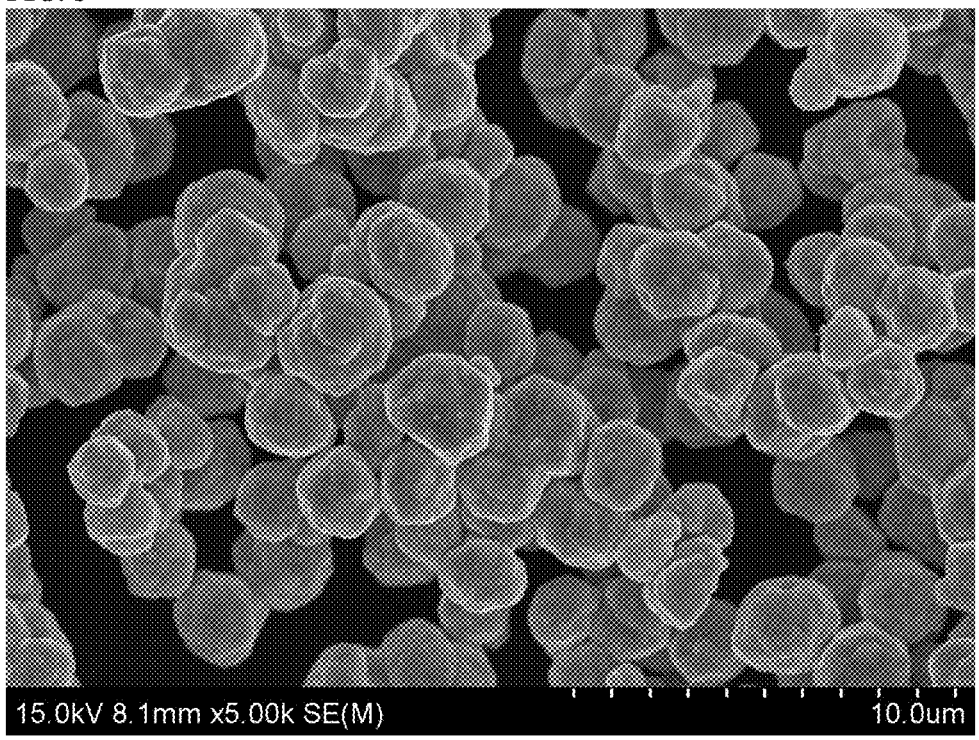
FIG. 3 is a FESEM image of Cu/Ag particles.
Figure 4:
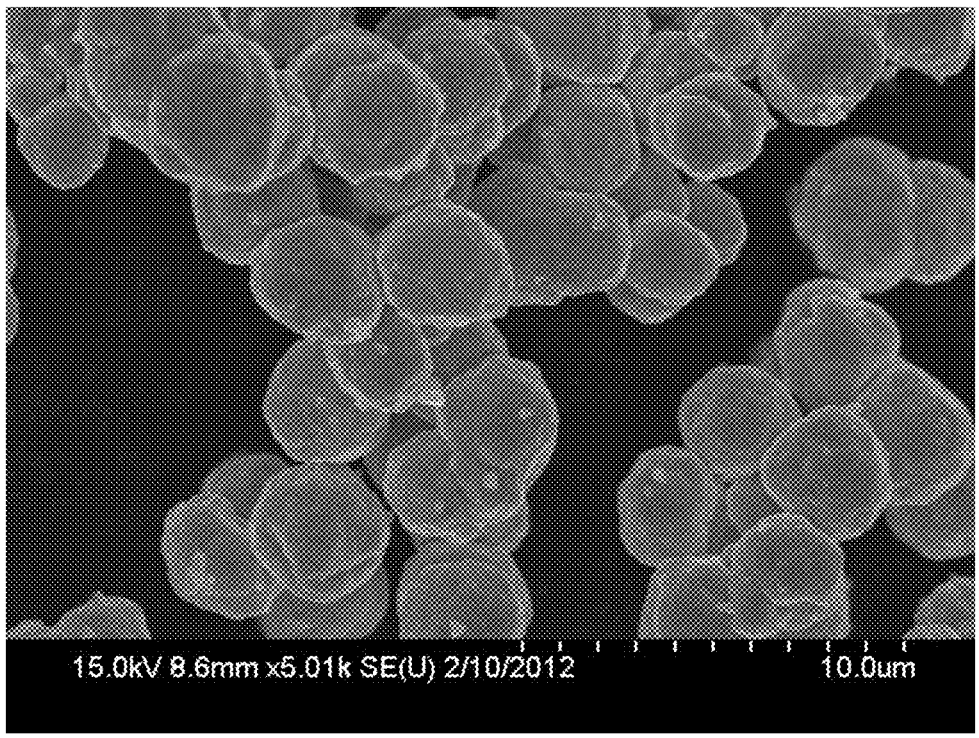
FIG. 4 is a FESEM image of Cu/Ag/SCN particles according to an embodiment of the present invention.

FIG. 2 is a field emission scanning electron microscope (FESEM) image of pure Cu particles, FIG. 3 is a FESEM image of Cu/Ag particles, and FIG. 4 is a FESEM image of Cu/Ag/SCN particles according to the embodiment of the present invention. FIG. 4 is a FESEM image of two hours after SCN coating reaction. As shown in FIG. 4, SCN was coated on a part having a thin silver coating layer or a part in which copper was exposed, and thereby blocking copper from contact with the air.

When a representative difference between Cu/Ag particles of FIG. 3 and Cu/Ag/SCN particles of FIG. 4 is examined, grains which seem like dots are shown at the outermost surface of the Cu/Ag/SCN particles of FIG. 4, and the grains are SCN, that is, a surface in which pores were clogged by SCN may be seen. However, when SCN is not coated, as shown in FIG. 3, the pores may be generated on a surface of the Cu/Ag particles, and copper may be oxidized because oxygen enters and exits through the unclogged pores. On the other hand, in the embodiment of the present invention, the influx of oxygen may be prevented by clogging the pores generated on a surface of the Cu/Ag particle by coating with SCN, and thereby providing an effect of increasing an oxidation temperature.

Figure 5:
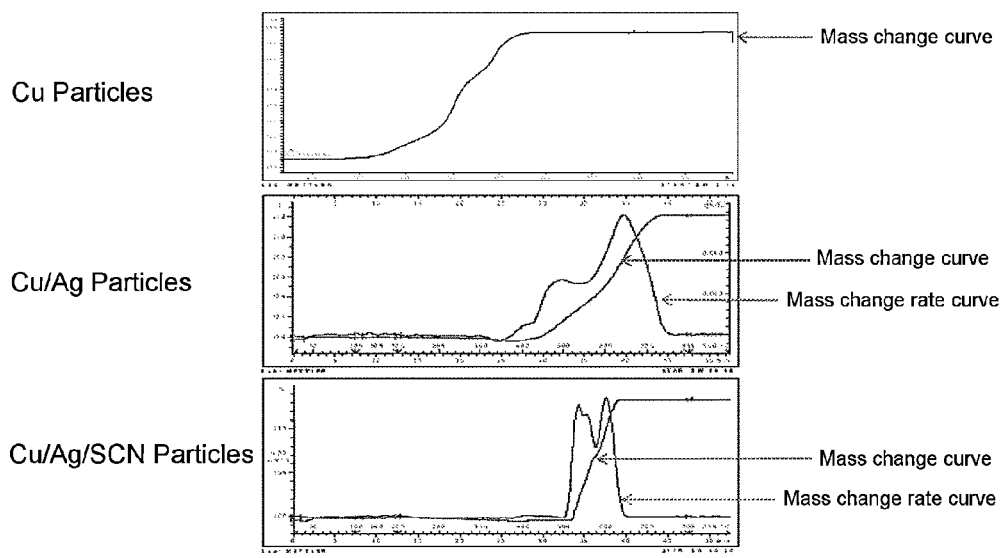
FIG. 5 is a graph comparing results of thermo gravimetric analysis (TGA) of pure Cu particles, Cu/Ag particles, and Cu/Ag/SCN particles according to an embodiment of the present invention.

FIG. 5 is a graph comparing results of thermogravimetric analysis (TGA) of pure Cu particles, Cu/Ag particles, and Cu/Ag/SCN particles according to the embodiment of the present invention. The TGA was performed at a temperature in the range of 25 to 800° C. (10° C./min) and air of 50 mL/min.

As can be determined from a top graph of FIG. 5, the uncoated pure Cu particles began to be oxidized at a temperature over 200° C.

As can be determined from a middle graph of FIG. 5, the Cu/Ag particles began to be oxidized at 350° C.

As can be determined from a bottom graph of FIG. 5, the Cu/Ag/SCN particles according to the embodiment of the present invention began to be oxidized at a temperature over 500° C., thereby showing an excellent antioxidant effect.

The invention claimed is:

1. A copper-containing particle comprising:
    a core containing a copper component;
    a shell formed on the surface of the core, containing a silver component, and having at least one pore; and
    a filler part configured to fill the pore of the shell and contain an antioxidant component,
    wherein a size of the pore is in the range of 0.1 to 100 nm,
    wherein the copper-containing particle begins to be oxidized at a temperature over 500° C. based on thermogravimetric analysis, and
    wherein the antioxidant component is a compound including a thiocyanate group.

2. The particle of claim 1, wherein the antioxidant component does not react with the silver component.

3. The particle of claim 1, wherein a thickness variation of the shell is ±50% of an average thickness of the shell.

4. The particle of claim 1, wherein the core is one or more types selected from the group consisting of a copper particle, a glass particle coated with copper, a ceramic particle coated with copper, a metal particle coated with copper, a polymer particle coated with copper, and a graphite particle coated with copper.

5. The particle of claim 4, wherein a ceramic of the ceramic particle coated with the copper is one or more types selected from the group consisting of aluminum oxide, aluminum nitride, beryllium oxide, tungsten carbide, silicon carbide, and zirconium oxide.

6. The particle of claim 4, wherein a metal of the metal particle coated with the copper is one or more types selected from the group consisting of nickel, iron, silicon, tungsten, cobalt, and aluminum.

7. The particle of claim 1, wherein the content of the silver component is in the range of 0.1 to 50 wt % with respect to a total weight of the copper-containing particle.

8. The particle of claim 1, wherein the content of the antioxidant component is in the range of 0.1 to 50 wt % with respect to a total weight of the copper-containing particle.

9. A conductive paste composition comprising the copper-containing particle of claim 1, a binder resin, and a solvent.

10. The composition of claim 9, further comprising a glass frit.

* * * * *